United States Patent
An et al.

(10) Patent No.: US 9,582,367 B2
(45) Date of Patent: Feb. 28, 2017

(54) REAL-TIME AUTOMATIC DATABASE DIAGNOSTIC MONITOR

(71) Applicant: Oracle International Corporation, Redwood City, CA (US)

(72) Inventors: George An, San Jose, CA (US); Pete Belknap, Redwood City, CA (US); Uri Shaft, Fremont, CA (US); Benoit Dageville, Truckee, CA (US); Ameet Kini, Herndon, VA (US)

(73) Assignee: Oracle International Corporation, Redwood Shores, CA (US)

( * ) Notice: Subject to any disclaimer, the term of this patent is extended or adjusted under 35 U.S.C. 154(b) by 742 days.

(21) Appl. No.: 13/721,895

(22) Filed: Dec. 20, 2012

(65) Prior Publication Data

US 2014/0095453 A1    Apr. 3, 2014

Related U.S. Application Data

(60) Provisional application No. 61/744,820, filed on Oct. 3, 2012.

(51) Int. Cl.
　　*G06F 17/30*　　(2006.01)
　　*G06F 11/14*　　(2006.01)
　　*G06F 11/32*　　(2006.01)

(52) U.S. Cl.
　　CPC .... G06F 11/1435 (2013.01); G06F 17/30424 (2013.01); *G06F 11/321* (2013.01); *G06F 11/323* (2013.01)

(58) Field of Classification Search
　　None
　　See application file for complete search history.

(56) References Cited

U.S. PATENT DOCUMENTS

2003/0033289 A1*　2/2003　Brinker et al. ............... 707/3
2006/0248034 A1*　11/2006　Soderberg et al. ........... 707/1

OTHER PUBLICATIONS

Microsoft Office, Database basics, retrieved on Aug. 8, 2015, retrieved from the internet <URL: https://support.office.com/en-za/article/Database-basics-a849ac16-07c7-4a31-9948-3c8c94a7c204>.*

* cited by examiner

*Primary Examiner* — Tyler Torgrimson
(74) *Attorney, Agent, or Firm* — Osha Liang LLP

(57) ABSTRACT

A method for obtaining data items from an unresponsive database host. The method includes receiving an indication that the database host is unresponsive, receiving, from a management server via a diagnostic connection, a first request for a first organized data item, and sending a first query, using a first interface, to a memory for the first organized data item. The method further includes receiving, from the management server via a normal connection, a second request for a second organized data item, retrieving, from memory on the database host, a first data item in response to the first query, converting the first data item into the first organized data item, and sending the first organized data item to the management server, wherein the first organized data item is analyzed to determine a source causing the database host to be unresponsive.

19 Claims, 13 Drawing Sheets

REAL-TIME AUTOMATIC DATABASE DIAGNOSTIC MONITOR

CROSS-REFERENCE TO RELATED APPLICATIONS

Pursuant to 35 U.S.C. §119(e), this application claims benefit of U.S. Provisional Application No. 61/744,820 filed on Oct. 3, 2012, entitled "REAL-TIME AUTOMATIC DATABASE DIAGNOSTIC MONITOR." The disclosure of the U.S. Provisional Application is incorporated herein by reference in its entirety.

BACKGROUND

Database systems are an integral part of many enterprise and commercial computer systems. Periods of down-time can result in costly delays for a business. If a database system becomes unresponsive, database administrators must attempt to resolve the issue as quickly as possible. Retrieving information about the unresponsive system can be essential in determining the cause of the unresponsiveness, as well as a solution.

SUMMARY

In general, in one aspect, the invention relates to a method for obtaining data items from an unresponsive database host. The method includes receiving an indication that the database host is unresponsive, receiving, from a management server via a diagnostic connection, a first request for a first organized data item, and sending a first query, using a first interface, to a memory for the first organized data item. The method further includes receiving, from the management server via a normal connection, a second request for a second organized data item, retrieving, from memory on the database host, a first data item in response to the first query, converting the first data item into the first organized data item, and sending the first organized data item to the management server, wherein the first organized data item is analyzed to determine a source causing the database host to be unresponsive.

In general, in one aspect, the invention relates to a system. The system includes a memory, a diagnostic connection agent, and a database server. The memory includes a shared global area (SGA), wherein the SGA comprises a first data item and a second data item. The diagnostic connection agent is configured to receive, from a management server via a diagnostic connection, a first request for a first organized data item, send a first query, using a first interface, to a memory for the first organized data item, retrieve, from the memory via the first interface, the first data item in response to the first query, wherein the first interface converts the first data item into the first organized data item, and send the first organized data item to the management server. The database server is configured to receive, from the management server via a normal connection, a second request for a second organized data item, where the first organized data item is analyzed to determine a source causing the system to be unresponsive.

In general, in one aspect, the invention relates to a non-transitory computer readable medium comprising instructions that, when executed by a processor, perform a method for obtaining data items from an unresponsive database host. The method includes receiving an indication that the database host is unresponsive, receiving, from a management server via a diagnostic connection, a first request for a first organized data item, and sending a first query, using a first interface, to a memory for the first organized data item. The method further includes receiving, from the management server via a normal connection, a second request for a second organized data item, retrieving, from memory on the database host, a first data item in response to the first query, converting the first data item into the first organized data item, and sending the first organized data item to the management server, wherein the first organized data item is analyzed to determine a source causing the database host to be unresponsive.

Other aspects of the invention will be apparent from the following description and the appended claims.

DETAILED DESCRIPTION

Figure 1:
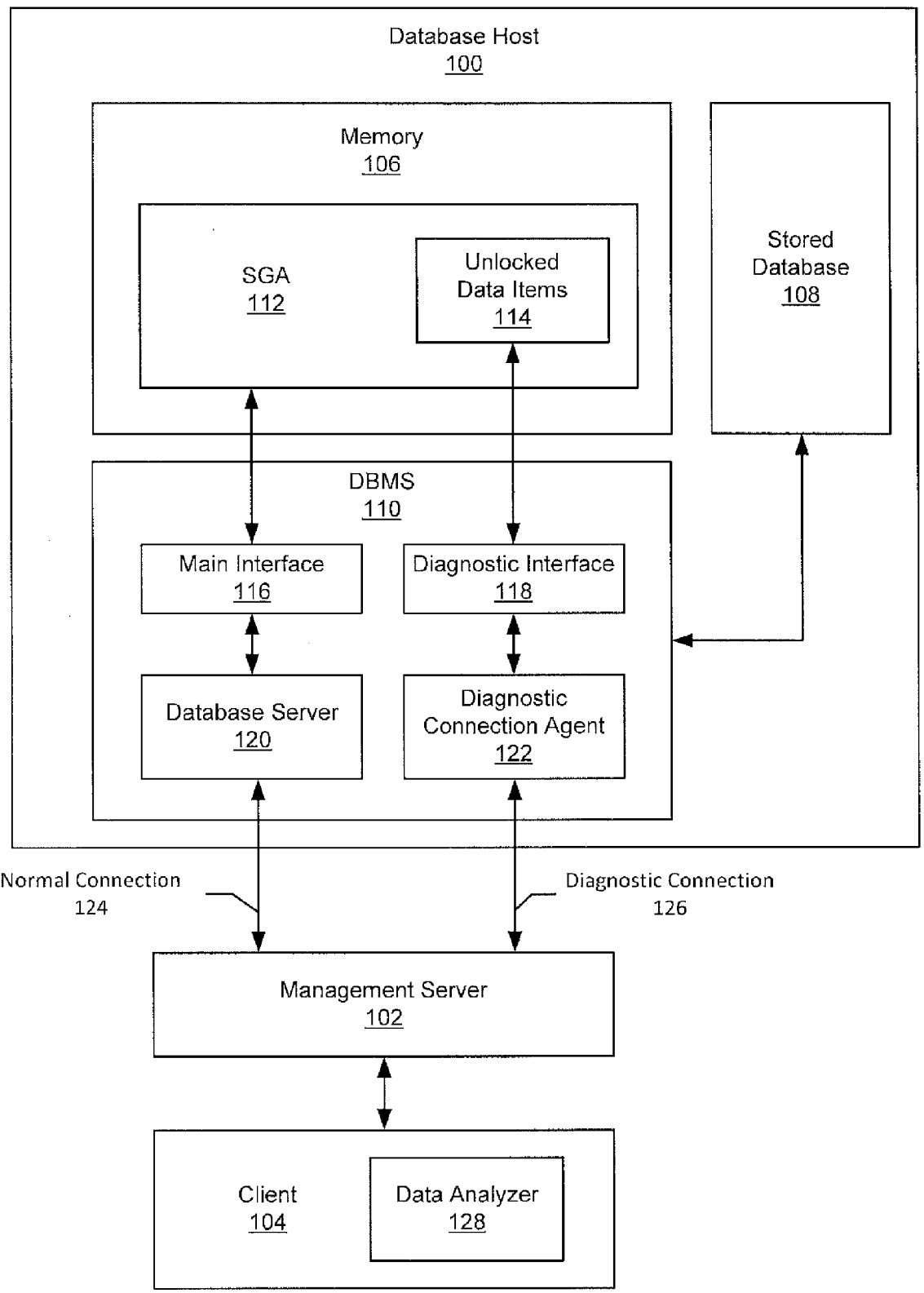
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for obtaining and analyzing data from an unresponsive database host. Specifically, embodiments of the invention may be used to retrieve data from the memory of a database host using two separate connections, and analyzing the data for immediate results.

FIG. 1 shows a diagram of a system in accordance with one or more embodiments of the invention. As shown in FIG. 1, the system includes a database host (100), a management server system (102), and a client system (104). The database host (100) includes memory (106), a stored database (108), and a database management system (DBMS) (110). The memory (106) includes a shared global area (SGA) (112), and the SGA (112) includes unlocked data items (114) and locked data items (not shown). The DBMS (110) includes a main interface (116), a diagnostic interface (118), a database server (120), and a diagnostic connection agent (122). The management server system (102) is connected to the database server (120) via a normal connection (124). The management server system (102) is connected to the diagnostic connection agent (122) via a diagnostic connection (126). The client system (104) includes a data analyzer (128).

In one or more embodiment of the invention, the database host (100) is a computer system or group of computer systems configured to service requests for data items stored in the stored database (108). Specifically, database host (100) is configured to receive data items from other connected computer systems, and store those data items in the stored database (108) for later retrieval.

In one or more embodiments of the invention, the DBMS (110) is a process or group of processes configured to manage the data items stored in the stored database (108). In one or more embodiments of the invention, the DBMS (110) includes multiple applications used to manage the stored database (108). In one or more embodiments of the invention, the data items stored in the stored database (108) are stored using a relational database model.

In one or more embodiments of the invention, the DBMS (110) includes multiple instances of a single application executing simultaneously on the database host (100). Specifically, each instance of an application executes on the database host (100) using a processor (not shown) and memory (106).

In one or more embodiments of the invention, the SGA (112) is a location in memory (106) where data shared by two or more application instances is stored. Specifically, the SGA (112) includes data accessible by multiple application instances. In one embodiment of the invention, the SGA (112) includes locked data items (not shown) and unlocked data items (114). In one embodiment of the invention, locked data items (not shown) include data items or areas of memory temporarily inaccessible by most processes with access to the SGA (112). In one embodiment of the invention, locked data items (not shown) may only be accessible by a single process or single group of processes to the exclusion of other processes that may normally have access to those data items. In one or more embodiments of the invention, data items may be set as locked data items during periods when those data items are being modified.

In one or more embodiments of the invention, unlocked data items (114) are data items that are not currently locked data items (not shown). Specifically, unlocked data items (114) are data items that are generally accessible by processes with access to the SGA (112).

In one or more embodiments of the invention, the database server (120) is a process or group of processes within the DBMS (110) configured to service requests for data items. In one embodiment of the invention, the requests for data items may include data items stored in the stored database (108) and data items stored in memory (106). In one embodiment of the invention, the database server (120) may be implemented as a structures query language (SQL) server.

In one or more embodiments of the invention, the database server (120) accesses data items stored in the SGA (112) using the main interface (116). In one embodiment of the invention, the arrangement of the data stored in the SGA (112) is not directly readable by the database server (120). In one embodiment of the invention, the main interface (116) is a mechanism by which data items stored in the SGA are retrieved, organized, and provided to the database server (120) in response to a query. In one embodiment of the invention, data items organized by the main interface are referred to as organized data items. In one embodiment of the invention, queries for the data items stored in the SGA (112) may be referred to as V$views. In one embodiment of the invention, data items stored in the SGA (112) are provided to the database server (120) in data tables. Such data tables may be referred to as V$tables.

In one or more embodiments of the invention, communication between the management server system (102) and the database host (100) is generally conducted via the normal connection (124). In one embodiment of the invention, requests for data items, including data items stored in the stored database and data items stored in the SGA, are made using the normal connection (124). In one embodiment of the invention, the normal connection (124) necessitates the instantiation of a session between the database server (120) and the application on the management server system (102) requesting access to one or more data items.

In one or more embodiments of the invention, the diagnostic connection agent (122) is a process or group of processes within the DBMS (110) configured to service requests for unlocked data items (114) within the SGA (112). Specifically, the diagnostic connection agent (122) is a process or group of process with unique hardware privileges allowing those processes to utilize processor and memory (106) resources during periods when other processes, including those that make up the database server (120), may be delayed in accessing the same resources.

In one or more embodiments of the invention, the diagnostic connection agent (122) accesses data items stored in the SGA (112) using the diagnostic interface (118). In one embodiment of the invention, the arrangement of the data stored in the SGA (112) is not directly readable by the diagnostic connection agent (122). In one embodiment of the invention, the diagnostic interface (118) is a mechanism by which data items stored in the SGA are retrieved, organized, and provided (e.g., in V$tables) to the diagnostic connection agent (122) in response to a query (e.g., V$views). In one embodiment of the invention, data items organized by the diagnostic interface (118) are referred to as organized data items. In one embodiment of the invention, the diagnostic interface (118) is unable to provide access to locked data items (not shown) within the SGA (112). In one embodiment of the invention, the diagnostic interface (118) provides access to the data items stored on the SGA (112) without attaching to the SGA (112). In other words, the diagnostic interface (118) provides access to the data items stored on the SGA (112) at a higher level than instant processes of other applications utilizing the SGA (112).

In one or more embodiments of the invention, a memory management unit (MMU) (not shown) is responsible for retrieving, organizing, and providing data items. Such data items may be requested by the database server (120) via the main interface (116) and/or by the diagnostic connection agent (122) via the diagnostic interface (118). In one embodiment of the invention, both locked and unlocked data items may be accessed in response to requests received via the main interface (116). In one embodiment of the invention, only unlocked data items may be accessed in response to requests received via the diagnostic interface (118).

In one or more embodiments of the invention, communication between the management server system (102) and the database host (100) using the diagnostic connection (126) is conducted during periods where the DBMS is generally unresponsive to requests for data items stored in the stored database (108). In one embodiment of the invention, the diagnostic connection (126) does not necessitate the instantiation of a session between the database server (120) and the application on the management server system (102) requesting access to one or more unlocked data items.

In one or more embodiment of the invention, the management server system (102) is a computer system or group of computer systems configured to communicate with the database host (100) and the client system (104). Specifically, the management server system includes one or more applications (not shown) configured to communicate with the database server (120) using the normal connection (124). The management server is further configured to communicate with the diagnostic connection agent (122) using the diagnostic connection (126). Further, the management server system (102) is configured to request and receive data items stored in the SGA (112) and provide those data items to the client system (104) for analysis.

In one or more embodiment of the invention, the client system (104) is a computer system or group of computer systems configured to communicate with the management server system (102) to request and receive data items from the database host (100). In one embodiment of the invention, the client system (104) is further configured to analyze the data items to determine the state of the database host (100). In one embodiment of the invention, the analysis is performed by the data analyzer (128).

Figure 2:
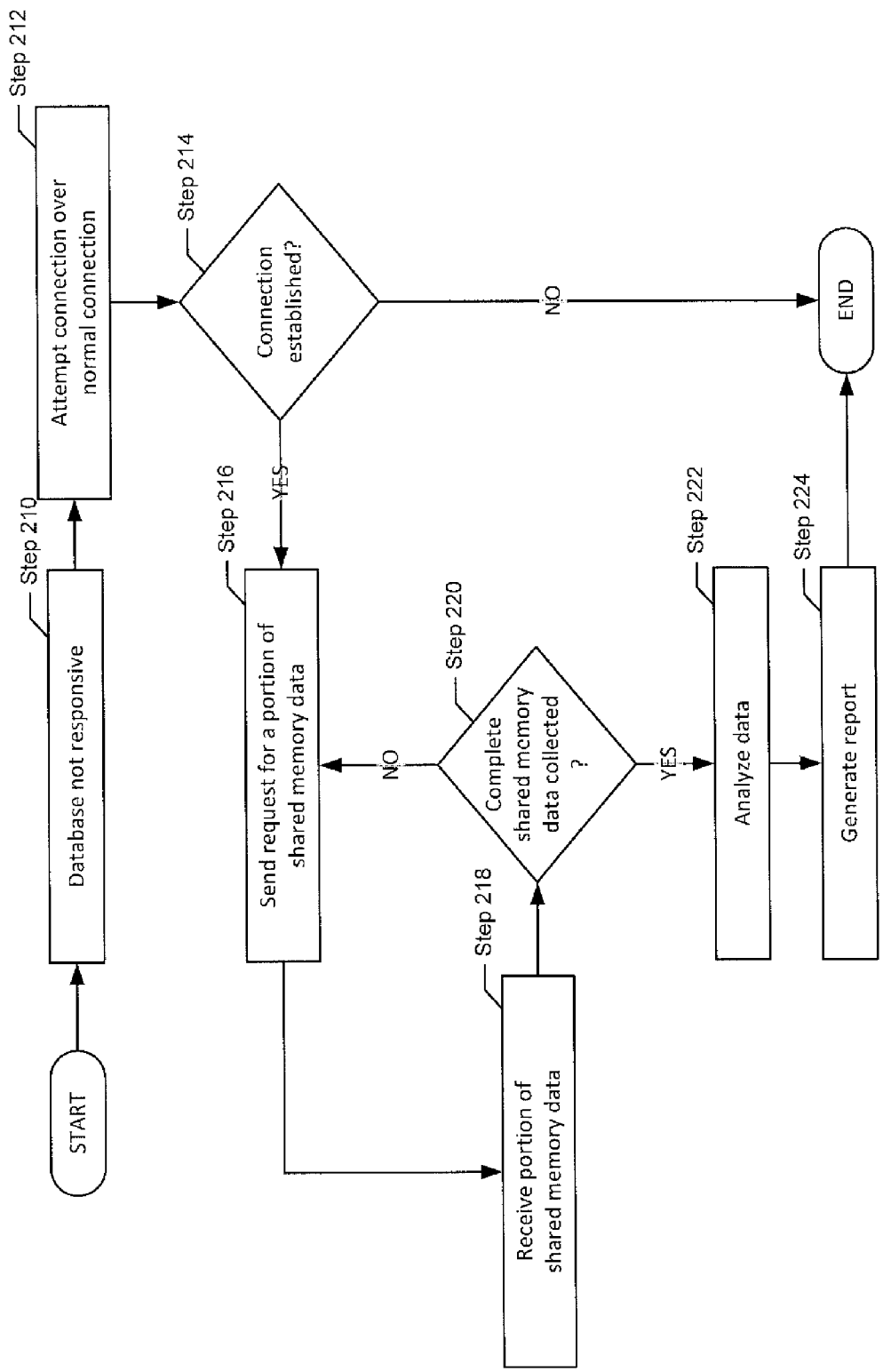
FIG. 2 shows a flow diagram in accordance with one or more embodiments of the invention.

FIG. 2 shows a flowchart for requesting data items using a normal connection in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 210, the client system is notified that the database has become non-responsive. In Step 212, the client instructs the management server to initiate a connection with the database server via a normal connection. In Step 214, the client system is notified regarding whether the connection over the normal connection has been established. If a connection over the normal connection cannot be established, then the flow ends.

If in Step 214, the client system is notified that a connection over the normal connection has been established, then in Step 216, the management server sends a request for a portion of the data items stored in the SGA. In one embodiment of the invention, the request is sent to the MMU via the main interface.

In one embodiment of the invention, once a request is received via the main interface, the MMU locates the target data item and attempts to acquire a lock on that target data item. In one embodiment of the invention, the target data item is locked, and the MMU may access the locked data item by acquiring an additional lock on the data item. The MMU may also access the locked data item by waiting until the target data item is unlocked, and then placing its own lock on that data item. Locking a data item may include triggering an access control mechanism (e.g., semaphore, mutex) associated with the data item being locked.

In Step 218, the management server receives a portion of the data items as organized data items from the database server. In one embodiment of the invention, the organized data items received may be immediately sent to the client system. In Step 220, the management server determines whether all of the available data items in the SGA have been collected.

If in Step 220, the management server determines that all of the available data items in the SGA have been collected, then in Step 222, the data items are analyzed. In one embodiment of the invention, the each portion of data items is analyzed as it is received. In one embodiment of the invention, the current collection of data items is compared to different models of database host behavior to determine the process or group of processes responsible for causing the database to become unresponsive. Examples of analysis results include, but are not limited to, whether the responsible processes are CPU bound, input/output bound, interconnect bound, or part of the paging mechanism; whether memory has been over-allocated; identification of, and reason for, hangs; whether a process is out of session; whether the archiver needs more space; whether the SQL has been over-utilized; whether there is a library cache contention or simulation; or whether there is a shared pool contention. In Step 224, a report is generated based on the analysis of the available organized data items.

Figure 3:
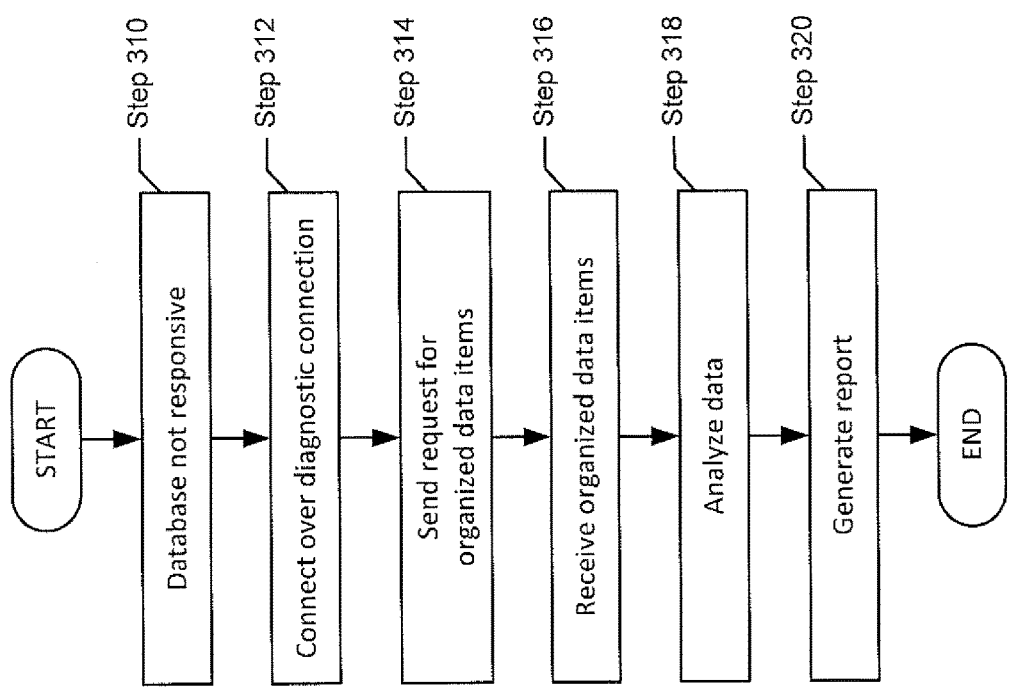
FIG. 3 shows a flow diagram in accordance with one or more embodiments of the invention.

FIG. 3 shows a flowchart for requesting data items using a diagnostic connection in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In one embodiment of the invention, the processes described in FIGS. 2 and 3 are performed in parallel in order to gather as much information about the database host as is available. In one embodiment of the invention, the process described in FIG. 3 is performed regardless of whether a connection is established between the management server and the database host over a normal connection.

In Step 310, the client system is notified that the database has become non-responsive. In Step 312, the client instructs the management server to connect to the database server via a diagnostic connection. In Step 314, the management server sends a request for organized unlocked data items in the SGA.

In one embodiment of the invention, the request is received by the diagnostic connection agent, and in response, the data items are requested from the SGA via the diagnostic interface. In one embodiment of the invention, requests made over the diagnostic interface are distinguished from those made over the main interface by the inclusion of a flag. For example, requests may include a flag indicating to the MMU that the request is intended for the diagnostic interface.

In one embodiment of the invention, data items in the SGA may be accessed via the diagnostic interface without first acquiring a lock on the data items. Consequently, in one embodiment of the invention, the MMU may be unable to access locked data items, and therefore only unlocked data items may be accessed via the diagnostic interface.

In Step 316, the management server receives the organized unlocked data items from the database host. In Step 318, the organized data items are analyzed. In one embodiment of the invention, each portion of data items is analyzed as it is received. In Step 320, a report is generated based on the analysis of the available organized data items.

Figure 4:
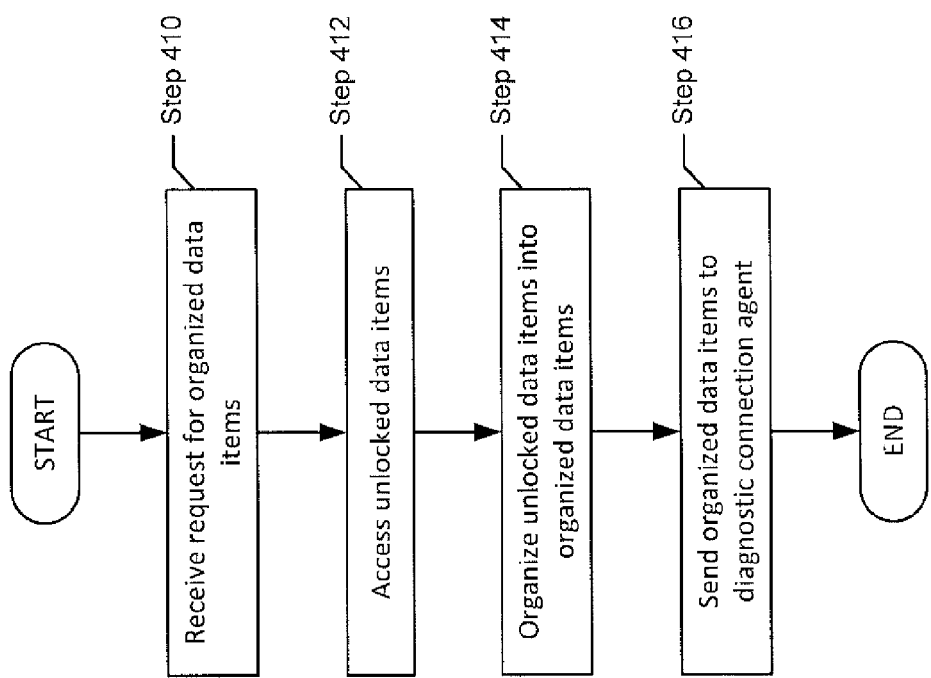
FIG. 4 shows a flow diagram in accordance with one or more embodiments of the invention.

FIG. 4 shows a flowchart for servicing a request for data items in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 410, a request for organized data items is received by the diagnostic connection agent. In Step 412, the diagnostic connection agent accesses the unlocked data items using the diagnostic interface. In Step 414, the diagnostic connection agent receives the requested unlocked data items as organized data items. In Step 416, the organized data items are sent to the management server.

Figure 5A:
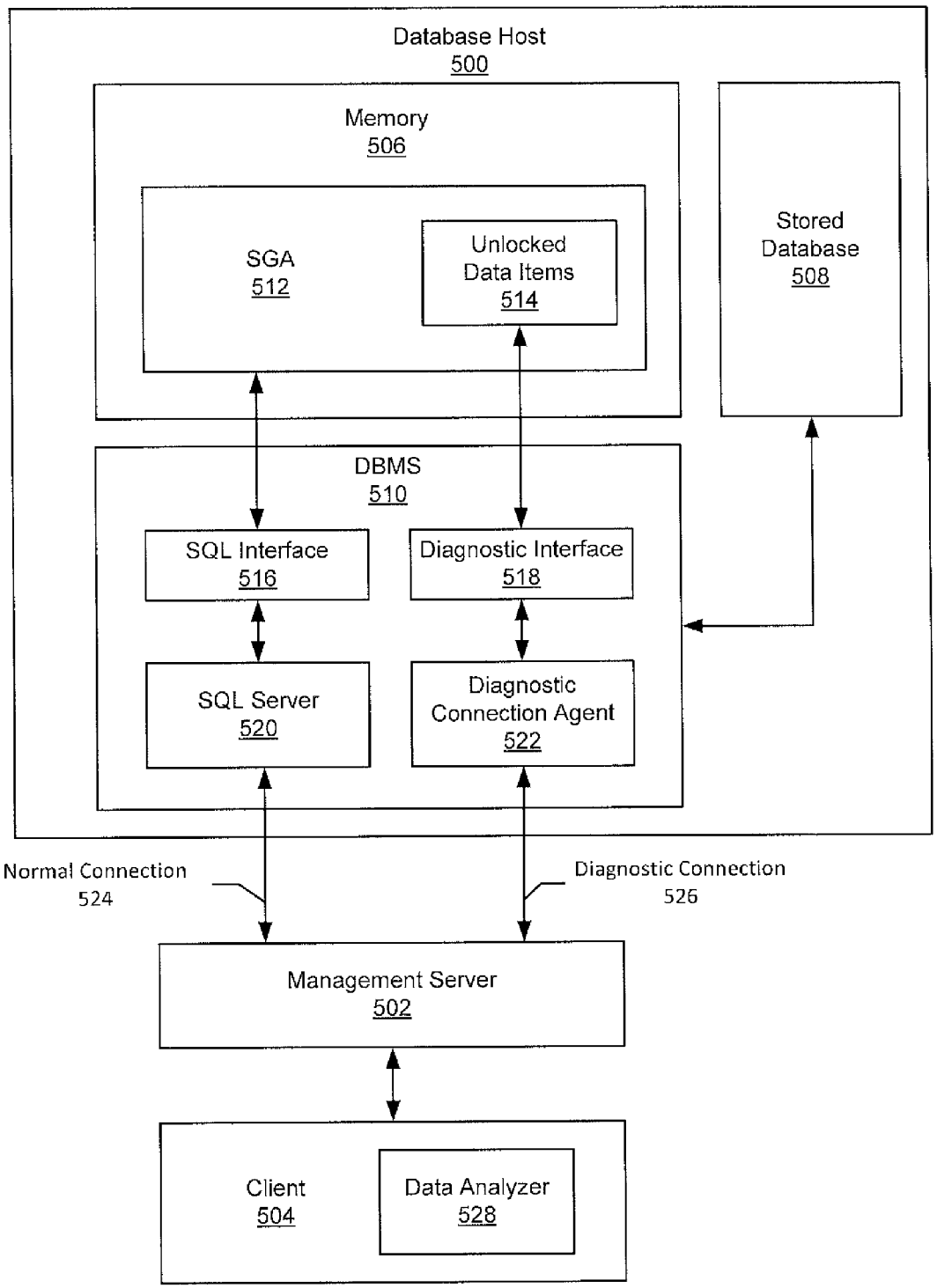
FIGS. 5A-5B show an example in accordance with one or more embodiments of the invention.
Figure 5B:
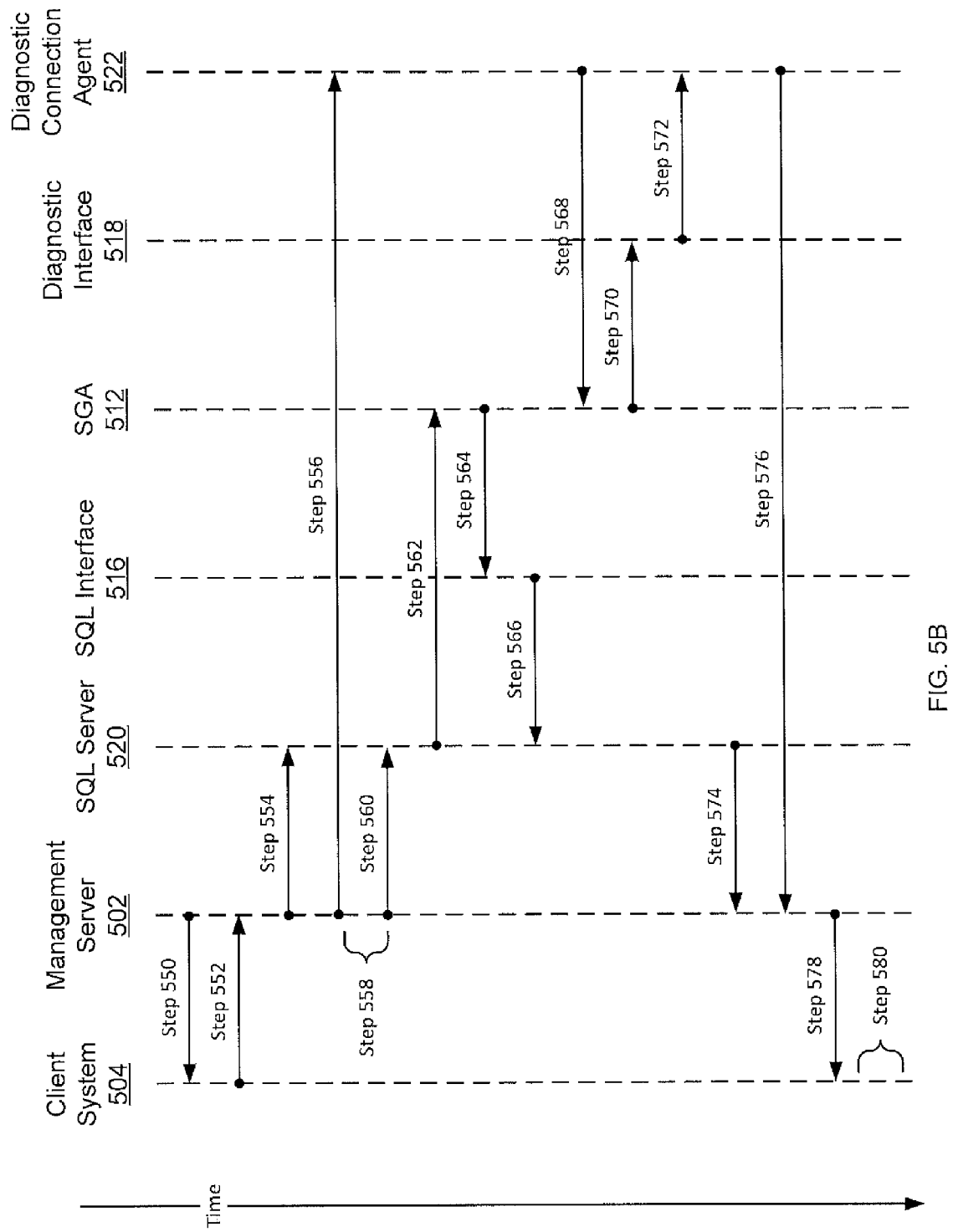

FIGS. 5A and 5B show an example in accordance with one or more embodiments of the invention. As shown in FIG. 5A, the example system includes a database host (500), a management server system (502), and a client system (504). The database host (500) includes memory (506), a stored database (508), and a database management system (DBMS) (510). The memory (506) includes a shared global area (SGA) (512), and the SGA (512) includes unlocked data items (514). The DBMS (510) includes an SQL interface (516), a diagnostic interface (518), an SQL server (520), and a diagnostic connection agent (522). The management server system (502) is connected to the database server (520) via a normal connection (524). The management server system (502) is connected to the diagnostic connection agent (522) via a diagnostic connection (526). The client system (504) includes a data analyzer (528).

FIG. 5B shows an example timeline in accordance with one or more embodiments of the invention. In Step 550, the client system (504) is notified that the database has become unresponsive. In Step 552, the client system (504) instructs the management server (502) to obtain organized data items from the SGA (512). In Step 554, the management server (502) initiates a connection with the database host (500) via a normal connection (524). In Step 556, the management server (502) also sends a V$view request for a V$table to the diagnostic connection agent (522) via the diagnostic connection (526).

In Step 558, a successful connection between the management server (502) and the SQL server (520) is established. In Step 560 an SQL request for a first V$table is sent to the SQL server (520). In Step 562, the SQL server requests the first V$table from the SGA (512) via the SQL interface (516). In Step 564, the data items that make up the first V$table are obtained from the SGA (512) and organized into the first V$table. In Step 566, the SQL server obtains the first V$table from the SGA (512) via the SQL interface (516).

In Step 568, the diagnostic connection agent (522) requests a second V$table from the SGA (512) via the diagnostic interface (518). In Step 570, the data items that make up the second V$table are obtained from the SGA (512) and organized into the second V$table. In Step 572, the diagnostic connection agent (522) obtains the second V$table from the SGA (512) via the diagnostic interface (518). In Step 574, the management server (502) receives the first V$table from the SQL server (520) via the normal connection (524). In Step 576, the management server (502) receives the second V$table from the diagnostic connection agent (522) via the diagnostic connection (526). In Step 578, a successful connection between the management server (502) and the client system (504) is established. In Step 580, the first V$table and the second V$table are analyzed by the analyzer on the client system, and a report is generated.

Figure 6A:
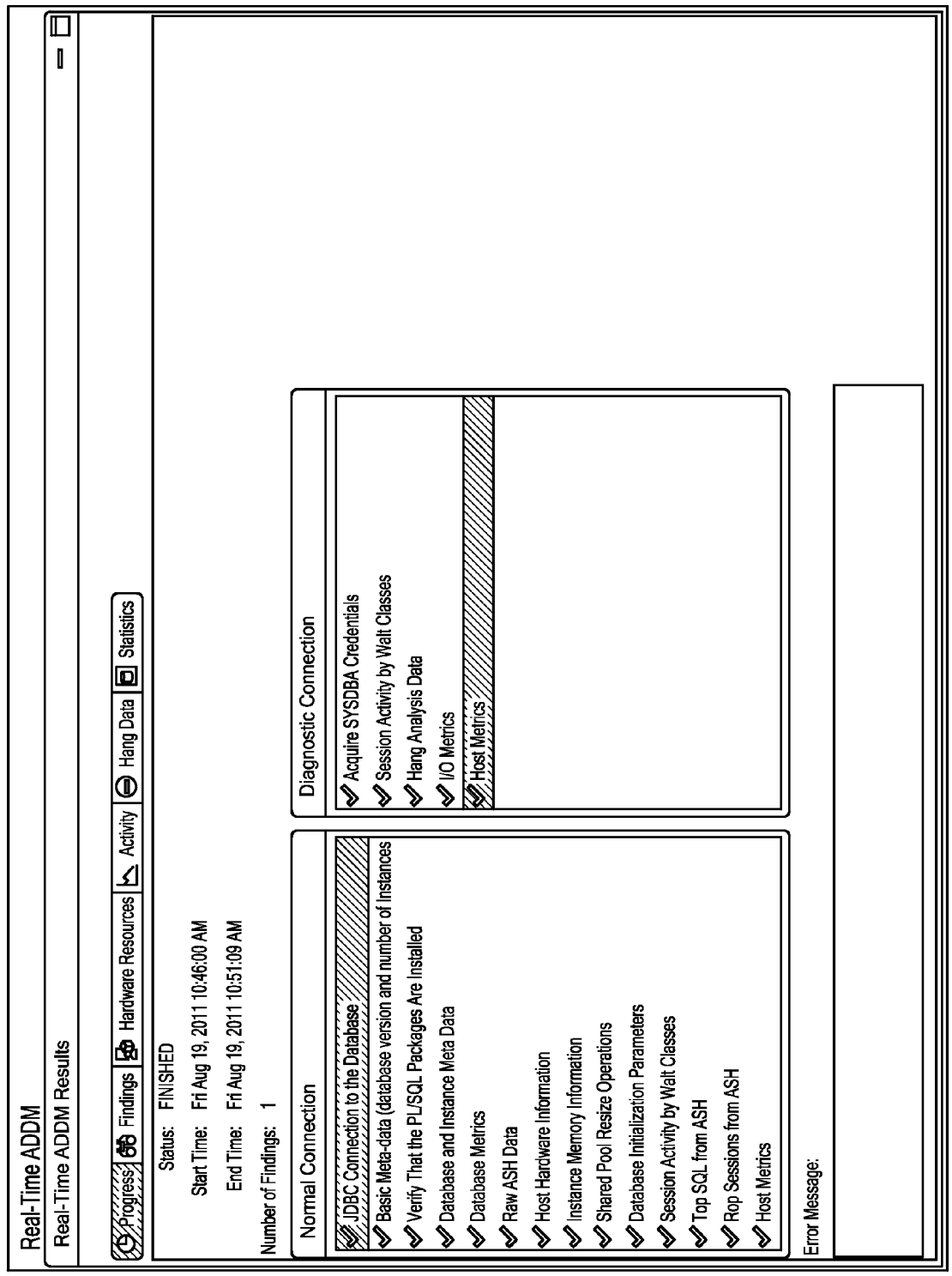
FIGS. 6A-6F show an example in accordance with one or more embodiments of the invention.
Figure 6B:
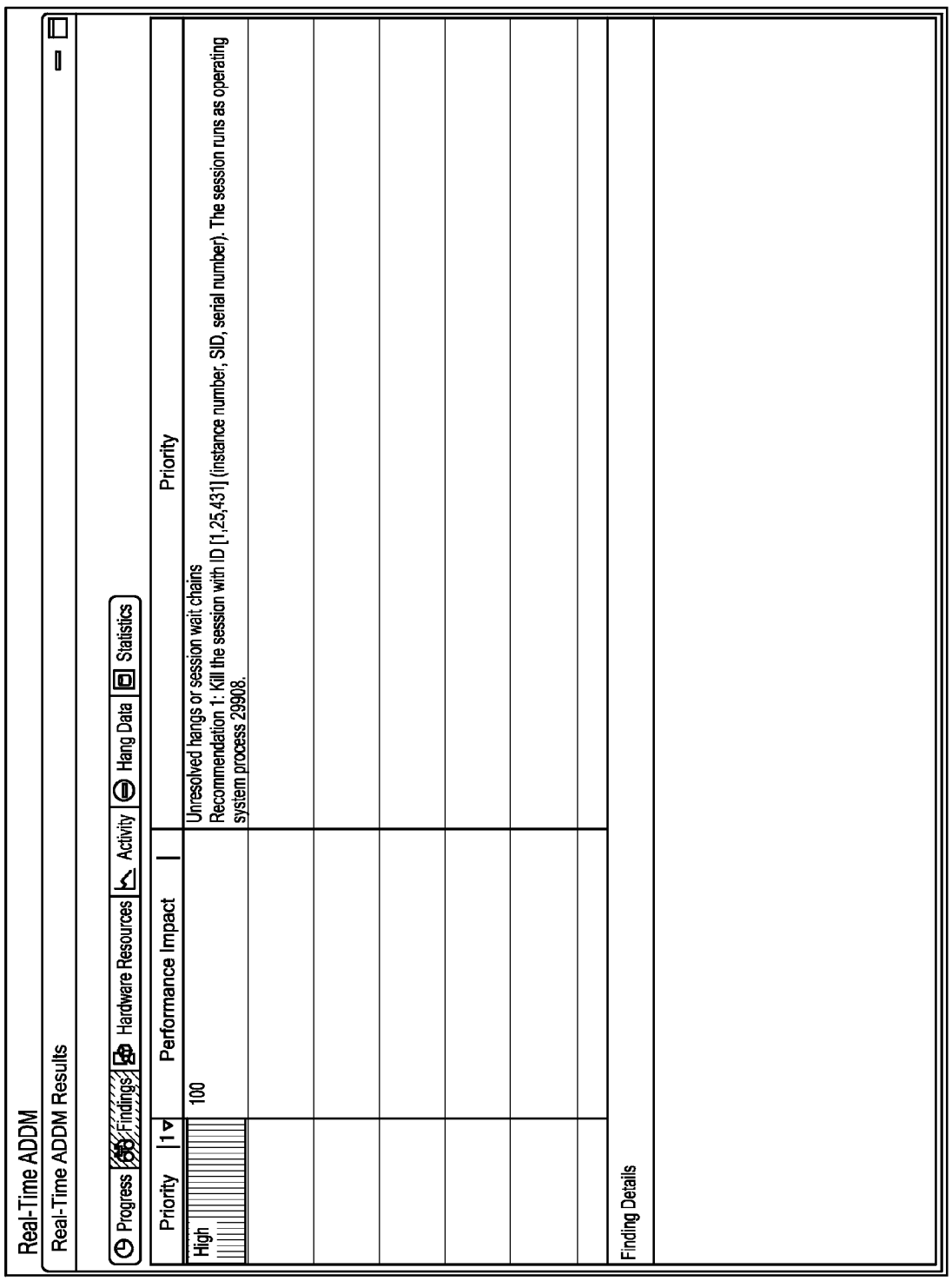
Figure 6C:
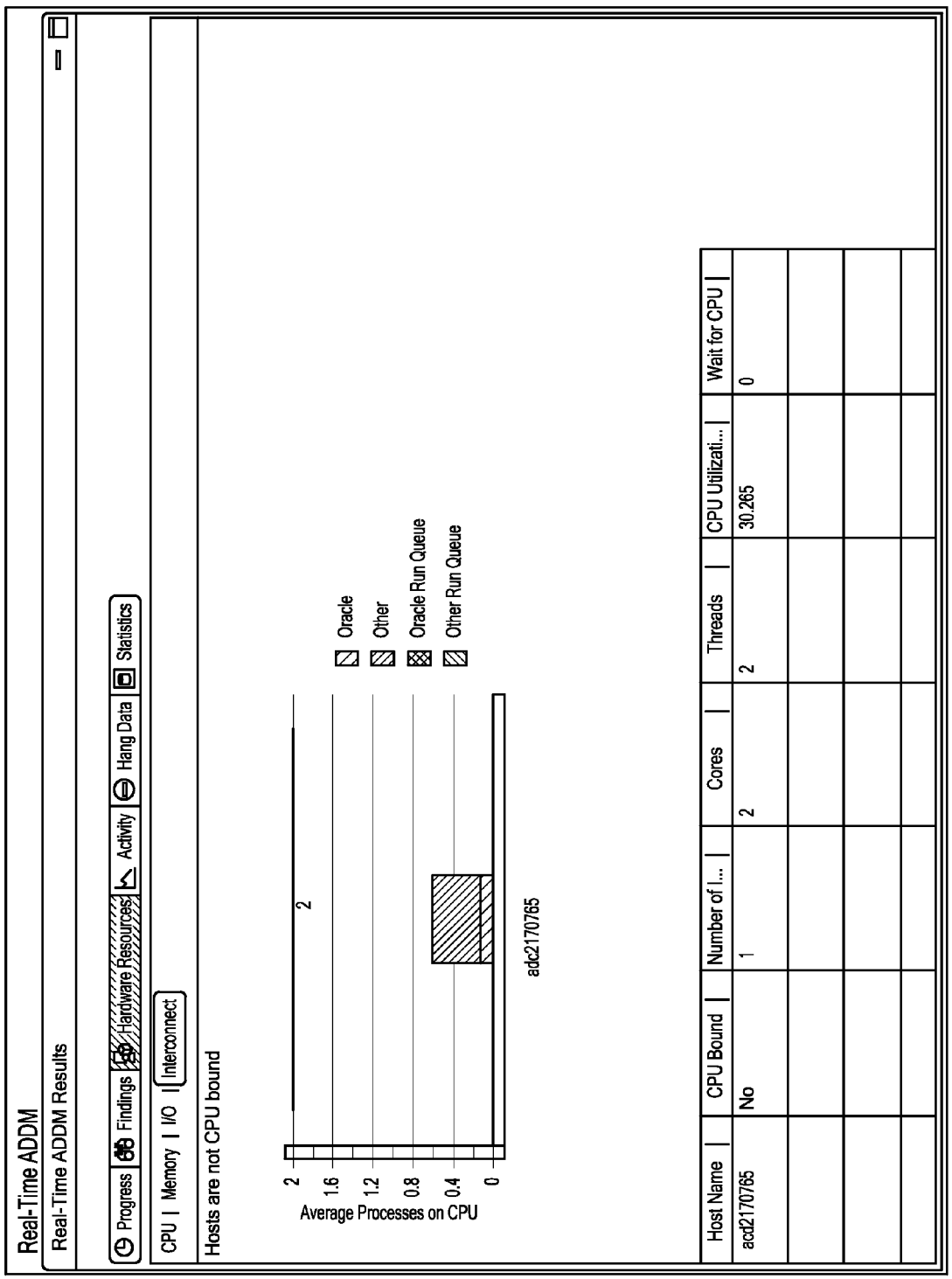
Figure 6D:
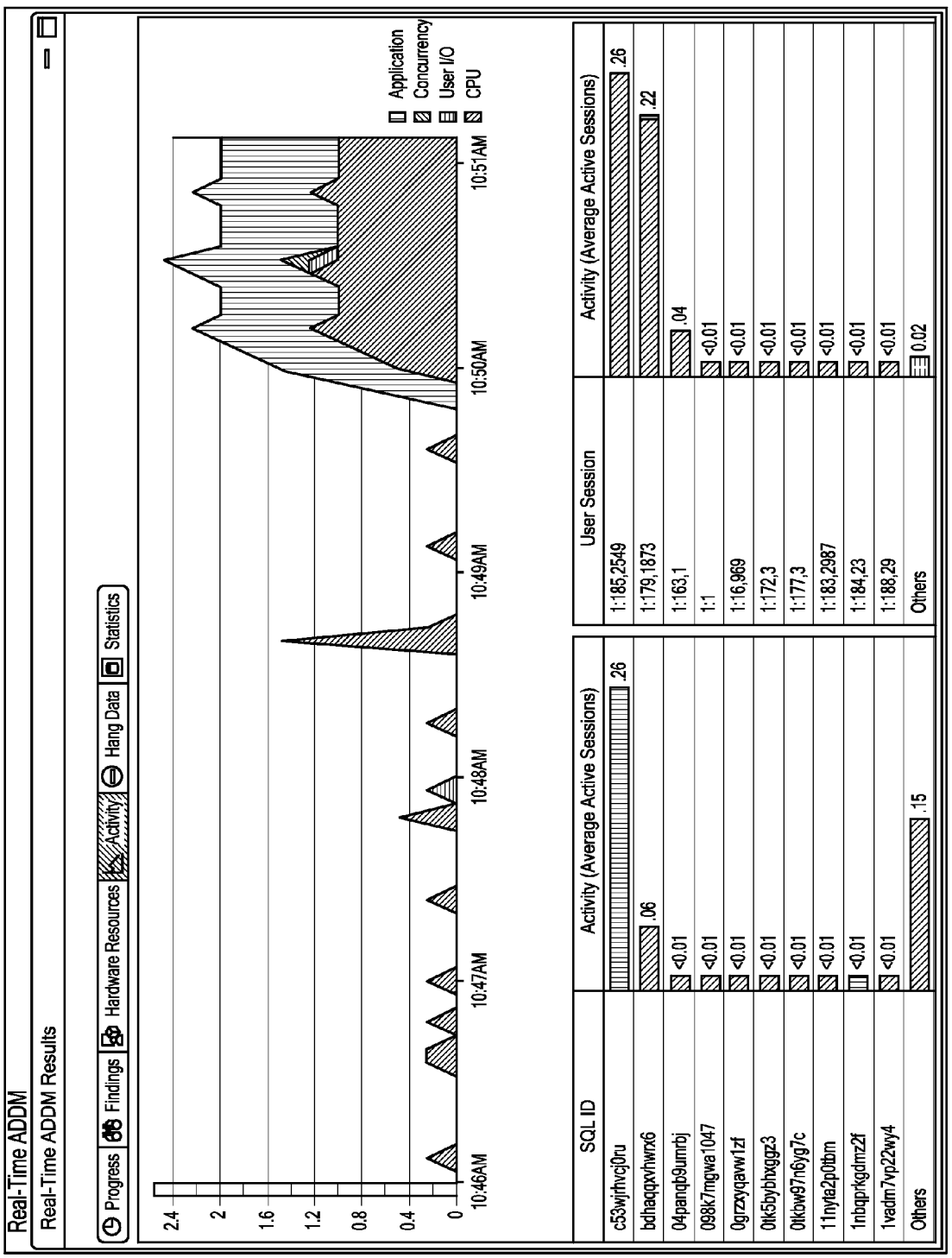
Figure 6E:
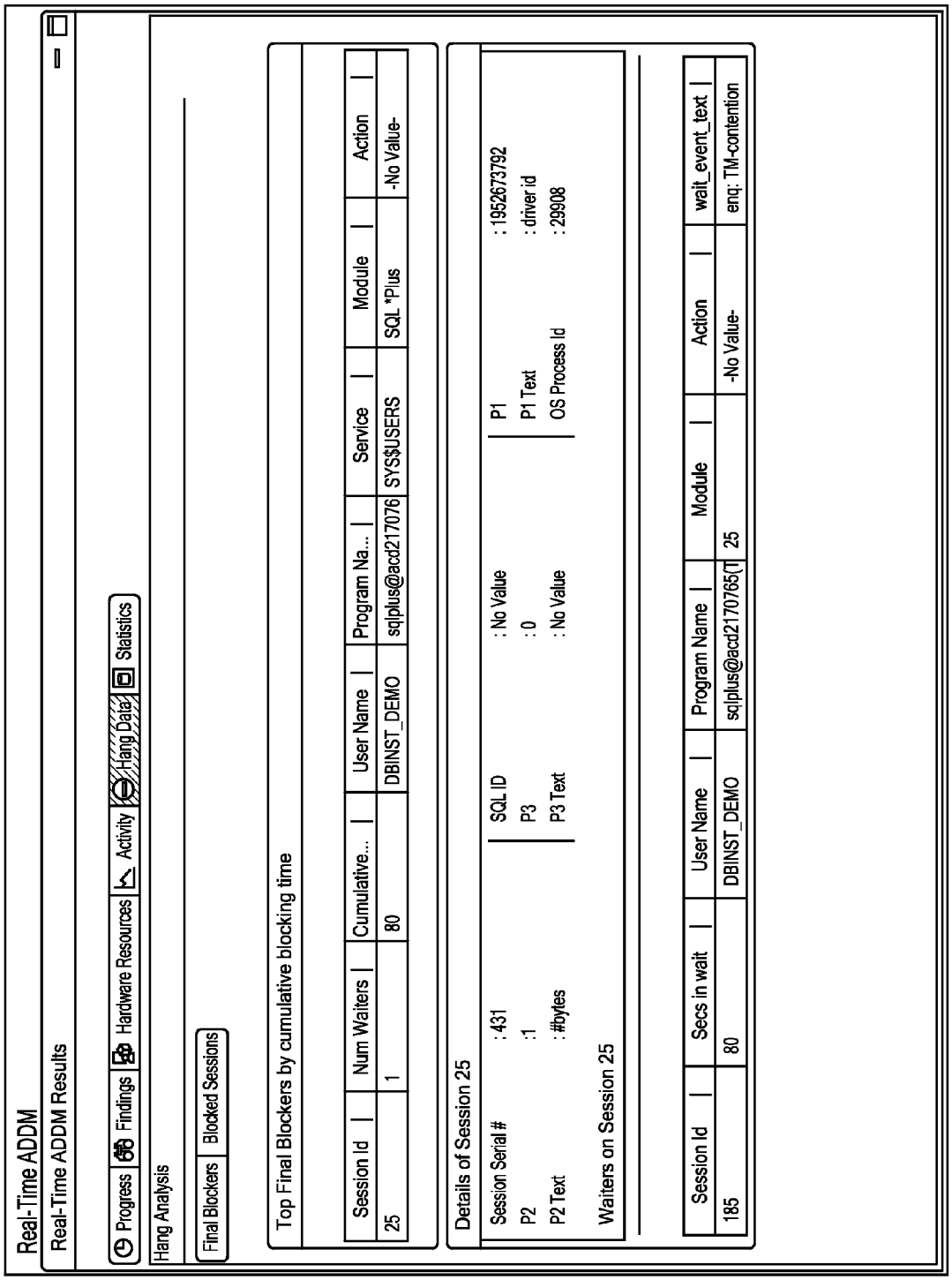
Figure 6F:
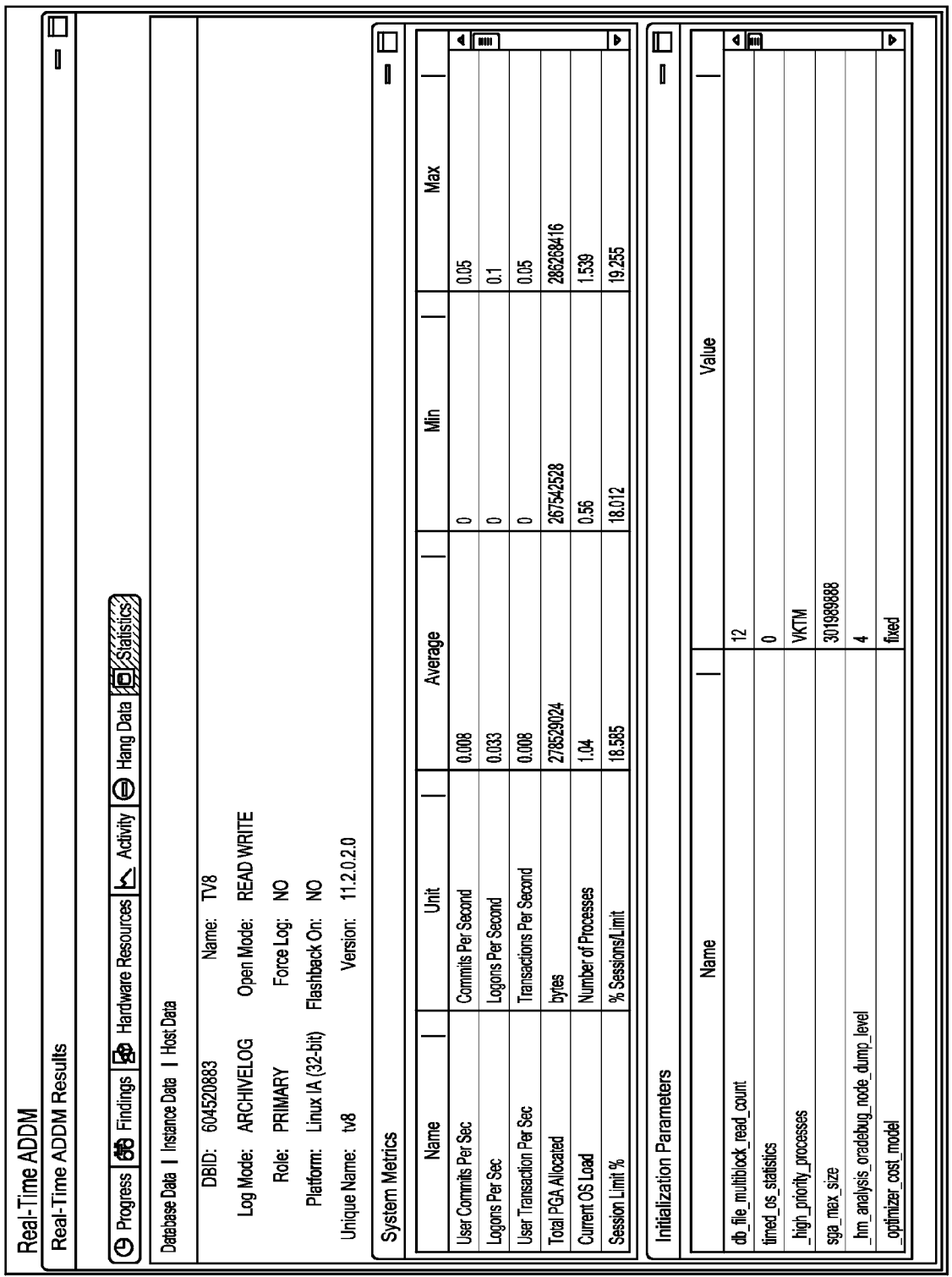

FIGS. 6A-6F show an example report in accordance with one or more embodiments of the invention. The report shown in FIGS. 6A-6F is not intended to limit the scope of the invention, and it should be appreciated that the interface presented in the example figures may be configured differently without exceeding the scope of the invention. FIG. 6A shows an example report of data items received from a database host. As shown in FIG. 6A, a normal connection was established, and fourteen data elements were retrieved over the normal connection. FIG. 6A also shows that five data elements were retrieved over the diagnostic connection. FIG. 6B shows an example recommendation based on an analysis of the data elements retrieved from the database host. FIG. 6C shows a graph of processes executing on the database host. FIG. 6D shows resource usage by different applications over time. FIG. 6E shows the length of time that resources on the system were blocked and by which processes. FIG. 6F shows different system performance metrics measured and recorded in the SGA.

Figure 7:
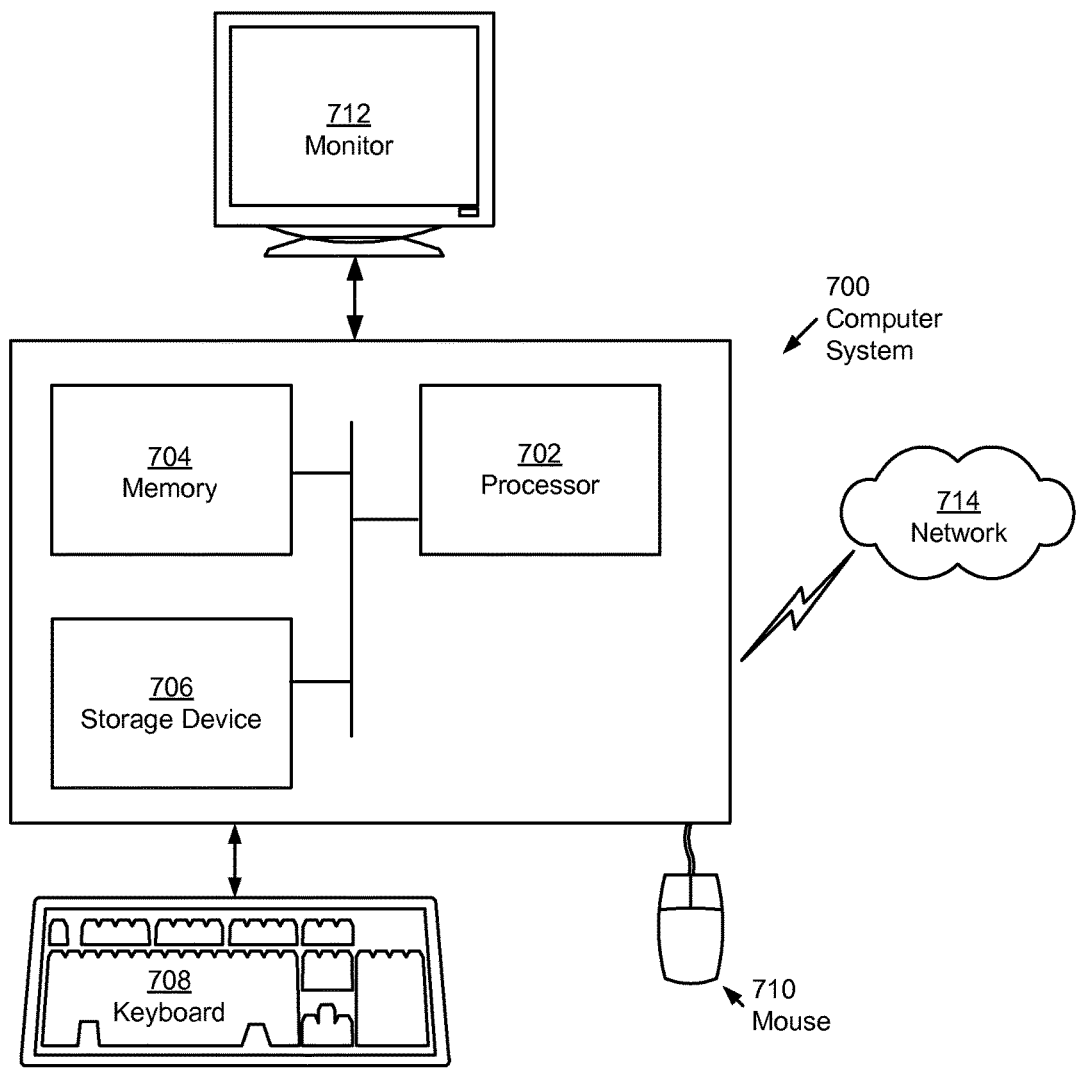
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) such as a central processing unit (CPU) or other hardware processor(s), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (702) is hardware. For example, the processor may be an integrated circuit. The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining data items from a database host comprising:
   receiving an indication that a database on the database host is unresponsive;

receiving, from a management server via a diagnostic connection, a first request for a first plurality of organized data items;
sending a first query, using a first interface, to a shared global area (SGA) stored within a memory on the database host for the first plurality of organized data items;
receiving, from the management server via a normal connection, a second request for a second plurality of organized data items;
sending a second query, using a second interface, to the SGA on the database host for the second plurality of organized data items;
retrieving, from the SGA on the database host, a first plurality of data items in response to the first query;
retrieving, from the SGA on the database host, a second plurality of data items in response to the second query;
converting the first plurality of data items into the first plurality of organized data items;
converting the second plurality of data items into the second plurality of organized data items;
sending the first plurality of organized data items to the management server;
sending the second plurality of organized data items to the management server;
analyzing the first plurality of organized data items and the second plurality of organized data items using a model of behavior of the database host to determine a process causing the database to be unresponsive; and
generating a recommendation based on the analysis.

2. The method of claim 1, wherein the first plurality of organized data items and the second plurality of organized data items are in the same format.

3. The method of claim 1, wherein the second interface is an SQL interface.

4. The method of claim 1, wherein a data item in the first plurality of data items is an unlocked data item.

5. The method of claim 1, wherein analyzing the first plurality of organized data items and the second plurality of organized data items to determine the process causing the database to be unresponsive is performed by a client system connected to the management server.

6. The method of claim 1, wherein the model of behavior is based on how the process utilizes a resource selected from a group consisting of an interconnect and a shared pool.

7. The method of claim 1, wherein the model of behavior is based on whether the memory has been over-allocated.

8. A system for obtaining data items from a database host comprising:
a memory comprising a shared global area (SGA), wherein the SGA comprises a first plurality of data items and a second plurality of data items;
a diagnostic connection agent configured to:
receive, from a management server via a diagnostic connection, a first request for a first plurality of organized data items;
send a first query, using a first interface, to the SGA for the first plurality of organized data items;
retrieve, from the SGA via the first interface, the first plurality of data items in response to the first query, wherein the first interface converts the first plurality of data items into the first plurality of organized data items; and
send the first plurality of organized data items to the management server; and
a database server configured to:
receive, from the management server via a normal connection, a second request for a second plurality of organized data items;
send a second query, using a second interface, to the SGA for the second plurality of organized data items;
retrieve, from the SGA via the second interface, the second plurality of data items in response to the second query, wherein the second interface converts the second plurality of data items into the second plurality of organized data items; and
send the second plurality of organized data items to the management server; and
a client configured to:
analyze the first plurality of organized data items and the second plurality of organized data items using a model of behavior of the database host to determine a process causing a database on the system to be unresponsive; and
generate a recommendation based on the analysis.

9. The system of claim 8, wherein the first plurality of organized data items and the second plurality of organized data items are in the same format.

10. The system of claim 8, wherein the second interface is an SQL interface.

11. The system of claim 8, wherein a data item in the first plurality of data items is an unlocked data item.

12. The system of claim 8, wherein the model of behavior is based on how the process utilizes a resource selected from a group consisting of an interconnect and a shared pool.

13. The system of claim 8, wherein the model of behavior is based on whether the memory has been over-allocated.

14. A non-transitory computer readable medium comprising instructions that, when executed by a processor, perform a method for obtaining data items from a database host, the method comprising:
receiving an indication that a database on the database host is unresponsive;
receiving, from a management server via a diagnostic connection, a first request for a first plurality of organized data items;
sending a first query, using a first interface, to a shared global area (SGA) on the database host for the first plurality of organized data items;
receiving, from the management server via a normal connection, a second request for a second plurality of organized data items;
sending a second query, using a second interface, to the shared global area (SGA) on the database host for the second plurality of organized data items;
retrieving, from the shared global area (SGA) on the database host, a first plurality of data items in response to the first query;
retrieving, from the shared global area (SGA) on the database host, a second plurality of data items in response to the second query;
converting the first plurality of data items into the first plurality of organized data items; converting the second plurality of data items into the second plurality of organized data items;
sending the first plurality of organized data items to the management server;
sending the second plurality of organized data items to the management server; and
analyzing the first plurality of organized data items and the second plurality of organized data items using a model of behavior of the database host to determine a process causing the database to be unresponsive.

15. The non-transitory computer readable medium of claim 14, wherein the first plurality of organized data items and the second plurality of organized data items are in the same format.

16. The non-transitory computer readable medium of claim 14, wherein the second interface is an SQL interface.

17. The non-transitory computer readable medium of claim 14, wherein a data item in the first plurality of data items is an unlocked data item.

18. The non-transitory computer readable medium of claim 14, wherein the model of behavior is based on how the process utilizes a resource selected from a group consisting of an interconnect and a shared pool.

19. The non-transitory computer readable medium of claim 14, wherein the model of behavior is based on whether the memory has been over-allocated.

\* \* \* \* \*